United States Patent
Ma et al.

(10) Patent No.: US 11,293,657 B2
(45) Date of Patent: Apr. 5, 2022

(54) AIR CONDITIONING SYSTEM AND PRESSURE RATIO CONTROL METHOD AND DEVICE THEREOF

(71) Applicants: GD MIDEA HEATING & VENTILATING EQUIPMENT CO., LTD., Foshan (CN); MIDEA GROUP CO., LTD., Foshan (CN)

(72) Inventors: Xihua Ma, Foshan (CN); Yongfeng Xu, Foshan (CN); Meibing Xiong, Foshan (CN); Linxing Ren, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 222 days.

(21) Appl. No.: 16/627,472

(22) PCT Filed: Oct. 24, 2017

(86) PCT No.: PCT/CN2017/107493
§ 371 (c)(1),
(2) Date: Dec. 30, 2019

(87) PCT Pub. No.: WO2019/071654
PCT Pub. Date: Apr. 18, 2019

(65) Prior Publication Data
US 2020/0158362 A1    May 21, 2020

(30) Foreign Application Priority Data
Oct. 12, 2017    (CN) .......................... 201710946020.1

(51) Int. Cl.
*F24F 11/30*    (2018.01)
*F24F 11/80*    (2018.01)
(Continued)

(52) U.S. Cl.
CPC .............. *F24F 11/30* (2018.01); *F24F 11/64* (2018.01); *F24F 11/65* (2018.01); *F24F 11/80* (2018.01);
(Continued)

(58) Field of Classification Search
CPC ..................................................... F25B 49/02
(Continued)

(56) References Cited

U.S. PATENT DOCUMENTS

| 5,150,581 A * | 9/1992 | Smith | F25B 1/10 62/115 |
| 5,203,179 A * | 4/1993 | Powell | F25B 41/31 62/180 |

(Continued)

FOREIGN PATENT DOCUMENTS

| CN | 101086361 A | 12/2007 |
| CN | 103807979 A | 5/2014 |

(Continued)

OTHER PUBLICATIONS

OA for CN application 201710946020.1 and English Translation.
(Continued)

*Primary Examiner* — Md Azad
(74) *Attorney, Agent, or Firm* — Dilworth & Barrese, LLP.; Michael J. Musella, Esq.

(57) ABSTRACT

Disclosed are an air conditioning system and its pressure ratio control method and device. The method includes: acquiring an actual pressure ratio of the compressor every preset time period in operation of the air conditioning system; judging whether the actual pressure ratio is greater than or equal to the first pressure ratio corresponding to a current level; controlling the compressor to downshift one level for operation if the actual pressure ratio is greater than or equal to the first pressure ratio corresponding to the
(Continued)

current level; further judging whether the actual pressure ratio is less than the second pressure ratio corresponding to the current level if the actual pressure ratio is less than the first pressure ratio corresponding to the current level; and controlling the compressor to upshift one level for operation if the actual pressure ratio is less than the second pressure ratio corresponding to the current level.

15 Claims, 1 Drawing Sheet

(51) Int. Cl.
*F24F 11/85* (2018.01)
*F24F 11/64* (2018.01)
*F24F 11/65* (2018.01)
*F25B 49/02* (2006.01)
*G05B 13/02* (2006.01)
*F24F 140/10* (2018.01)
*F24F 110/10* (2018.01)

(52) U.S. Cl.
CPC ............. *F24F 11/85* (2018.01); *F25B 49/02* (2013.01); *G05B 13/0205* (2013.01); *F24F 2110/10* (2018.01); *F24F 2140/10* (2018.01)

(58) Field of Classification Search
USPC ........................................ 700/276
See application file for complete search history.

(56) References Cited

U.S. PATENT DOCUMENTS

| 2013/0145785 | A1* | 6/2013 | Nobuhiro | F25B 13/00 62/160 |
| 2014/0230466 | A1 | 8/2014 | Noll et al. | |
| 2016/0361975 | A1* | 12/2016 | Blatchley | B60H 1/3216 |
| 2020/0158362 | A1 | 5/2020 | Ma et al. | |

FOREIGN PATENT DOCUMENTS

| CN | 105605752 A | 5/2016 |
| CN | 106440591 A | 2/2017 |
| CN | 106595154 A | 4/2017 |
| CN | 106642806 A | 5/2017 |
| CN | 107238240 A | 10/2017 |
| JP | 2003254589 A | 9/2003 |
| JP | 2015031411 A | 2/2015 |
| KR | 101591327 B1 | 2/2016 |
| WO | 2016009559 A1 | 1/2016 |
| WO | 2019071654 A1 | 4/2019 |

OTHER PUBLICATIONS

Canadian Office Action from Canadian Patent Application No. 3069025 dated Mar. 5, 2021.
International Search Report and Written Opinion dated Jun. 29, 2018 from State Intellectual Property Office of the P.R. China.

* cited by examiner

AIR CONDITIONING SYSTEM AND PRESSURE RATIO CONTROL METHOD AND DEVICE THEREOF

The present disclosure is a national stage filing of international application. PCT/CN2017/107493, filed on Oct. 24, 2017, and claims priority to Chinese Patent Application No. 201710946020.1, filed on Oct. 12, 2017, the entire contents of each of which are incorporated herein by reference.

FIELD

The present disclosure relates to the field of air conditioning technology, in particular to a pressure ratio control method for an air conditioning system, a pressure ratio control device for an air conditioning system and an air conditioning system having the same.

BACKGROUND

In an air conditioning system, in order to ensure that a compressor operates in a safe and reliable range, a pressure ratio (i.e., a ratio of an exhaust pressure to an air return pressure) cannot be too high. In a low-temperature heating environment, when an output value of the compressor is high, the air conditioning system will have a very low pressure, resulting in an over-high pressure ratio in the air conditioning system. If the air conditioning system operates at such an over-high pressure ratio for a long period, damage will be caused to the compressor. Therefore, there is a need to avoid the over-high pressure ratio.

SUMMARY

The present disclosure aims to solve at least one of the above technical problems in the related art to some extent. Therefore, a first object of the present disclosure is to provide a pressure ratio control method for an air conditioning system, which can control a pressure ratio to be under a target limit value by adjusting a maximum limit output value of the compressor level-by-level, thereby preventing the compressor from long-term operation beyond a safe operation range, and thus guaranteeing reliability of the compressor A second object of the present disclosure is to provide a non-transitory computer readable storage medium.

A third object of the present disclosure is to provide a pressure ratio control device for an air conditioning system.

A fourth object of the present disclosure is to provide an air conditioning system.

In order to achieve the above objects, in the first aspect, the present disclosure provides in embodiments a pressure ratio control method for an air conditioning system. The air conditioning system includes a compressor, the compressor is provided with a plurality of levels, each level corresponds to a first pressure ratio and a second pressure ratio which are preset in advance, and the first pressure ratio is greater than the second pressure ratio. The pressure ratio control method includes the following steps: acquiring an actual pressure ratio of the compressor every preset time period in operation of the air conditioning system; judging whether the actual pressure ratio is greater than or equal to the first pressure ratio corresponding to a current level; controlling the compressor to downshift one level for operation if the actual pressure ratio is greater than or equal to the first pressure ratio corresponding to the current level; further judging whether the actual pressure ratio is less than the second pressure ratio corresponding to the current level if the actual pressure ratio is less than the first pressure ratio corresponding to the current level; and controlling the compressor to upshift one level for operation if the actual pressure ratio is less than the second pressure ratio corresponding to the current level.

According to the pressure ratio control method for an air conditioning system in embodiments of the present disclosure, the actual pressure ratio of the compressor is acquired every preset time period in operation of the air conditioning system, it is then judged whether the actual pressure ratio is greater than or equal to the first pressure ratio corresponding to the current level. If the actual pressure ratio is greater than or equal to the first pressure ratio corresponding to the current level, the compressor is controlled to downshift one level for operation; if the actual pressure ratio is less than the first pressure ratio corresponding to the current level, it is further judged whether the actual pressure ratio is less than the second pressure ratio corresponding to the current level; and if the actual pressure ratio is less than the second pressure ratio corresponding to the current level, the compressor is controlled to upshift one level for operation. Therefore, by adjusting the maximum limit output value of the compressor level-by-level, the present method can control the pressure ratio to be under the target limit value, thereby preventing the compressor from long-term operation beyond a safe operation range, and thus guaranteeing reliability of the compressor.

In addition, the pressure ratio control method for an air conditioning system, proposed according to the above embodiments of the present disclosure, is further characterized by the following additional features.

In an embodiment of the present disclosure, the pressure ratio control method further includes: controlling the compressor to be maintained at the current level for operation, when the actual pressure ratio is less than the first pressure ratio corresponding to the current level and greater than or equal to the second pressure ratio corresponding to the current level.

In an embodiment of the present disclosure, the acquiring an actual pressure ratio of the compressor includes: acquiring an exhaust pressure and an air return pressure of the compressor; and calculating a ratio of the exhaust pressure to the air return pressure as the actual pressure ratio of the compressor.

In an embodiment of the present disclosure, each level further corresponds to a maximum output value which is preset for the compressor in advance, wherein the pressure ratio control method further includes: controlling the compressor to operate at an actual output value less than or equal to a maximum output value corresponding to the current level when the compressor operates at individual levels.

In an embodiment of the present disclosure, the air conditioning system operates in a low-temperature heating mode.

In order to achieve the above objects, in the second aspect, the present disclosure provides in embodiments a non-transitory computer readable storage medium having stored therein a computer program that, when executed by a processor, causes the processor to perform a pressure ratio control method for an air conditioning system as described above.

By performing the pressure ratio control method for an air conditioning system as described above, the non-transitory computer readable storage medium according to embodiments of the present disclosure can control the pressure ratio to be under the target limit value through adjusting the maximum limit output value of the compressor level-by-level, thereby preventing the compressor from long-term operation beyond a safe operation range, and thus guaranteeing reliability of the compressor.

In order to achieve the above objects, in the third aspect, the present disclosure provides in embodiments a pressure ratio control device for an air conditioning system. The air conditioning system includes a compressor, the compressor is provided with a plurality of levels, each level corresponds to a first pressure ratio and a second pressure ratio which are preset in advance, and the first pressure ratio is greater than the second pressure ratio. The pressure ratio control device includes: a pressure ratio acquiring module configured to acquire an actual pressure ratio of the compressor every preset time period in operation of the air conditioning system; a judging module configured to judge whether the actual pressure ratio is greater than or equal to the first pressure ratio corresponding to a current level; and a control module configured to control the compressor to downshift one level for operation when the actual pressure ratio is greater than or equal to the first pressure ratio corresponding to the current level. The judging module is further configured to judge whether the actual pressure ratio is less than the second pressure ratio corresponding to the current level when the actual pressure ratio is less than the first pressure ratio corresponding to the current level. The control module is further configured to control the compressor to upshift one level for operation when the actual pressure ratio is less than the second pressure ratio corresponding to the current level According to the pressure ratio control device for an air conditioning system in embodiments of the present disclosure, the actual pressure ratio of the compressor is acquired by the pressure ratio acquiring module every preset time period in operation of the air conditioning system, it is then judged by the judging module whether the actual pressure ratio is greater than or equal to the first pressure ratio corresponding to the current level. If yes, the control module controls the compressor to downshift one level for operation; if no, it is further judged by the judging module whether the actual pressure ratio is less than the second pressure ratio corresponding to the current level; and if the actual pressure ratio is less than the second pressure ratio corresponding to the current level, the control module controls the compressor to upshift one level for operation. Therefore, by adjusting the maximum limit output value of the compressor level-by-level, the present device can control the pressure ratio to be under the target limit value, thereby preventing the compressor from long-term operation beyond a safe operation range, and thus guaranteeing reliability of the compressor.

In addition, the pressure ratio control device for an air conditioning system, proposed according to the above embodiments of the present disclosure, is further characterized by the following additional features.

In an embodiment of the present disclosure, the control module is further configured to control the compressor to be maintained at the current level for operation, when the actual pressure ratio is less than the first pressure ratio corresponding to the current level and greater than or equal to the second pressure ratio corresponding to the current level.

In an embodiment of the present disclosure, the pressure ratio acquiring module is further configured to acquire an exhaust pressure and an air return pressure of the compressor; and calculate a ratio of the exhaust pressure to the air return pressure as the actual pressure ratio of the compressor.

In an embodiment of the present disclosure, each level further corresponds to a maximum output value which is preset for the compressor in advance, wherein the control module is further configured to control the compressor to operate at an actual output value less than or equal to a maximum output value corresponding to the current level when the compressor operates at individual levels.

In an embodiment of the present disclosure, the air conditioning system operates in a low-temperature heating mode.

In order to achieve the above objects, in the fourth aspect, the present disclosure provides in embodiments an air conditioning system, including a pressure ratio control device for an air conditioning system as described above.

With the pressure ratio control device for an air conditioning system as described above, the air conditioning system according to embodiments of the present disclosure can control the pressure ratio to be under the target limit value through adjusting the maximum limit output value of the compressor level-by-level, thereby preventing the compressor from long-term operation beyond a safe operation range, and thus guaranteeing reliability of the compressor.

DETAILED DESCRIPTION

Figure 1:
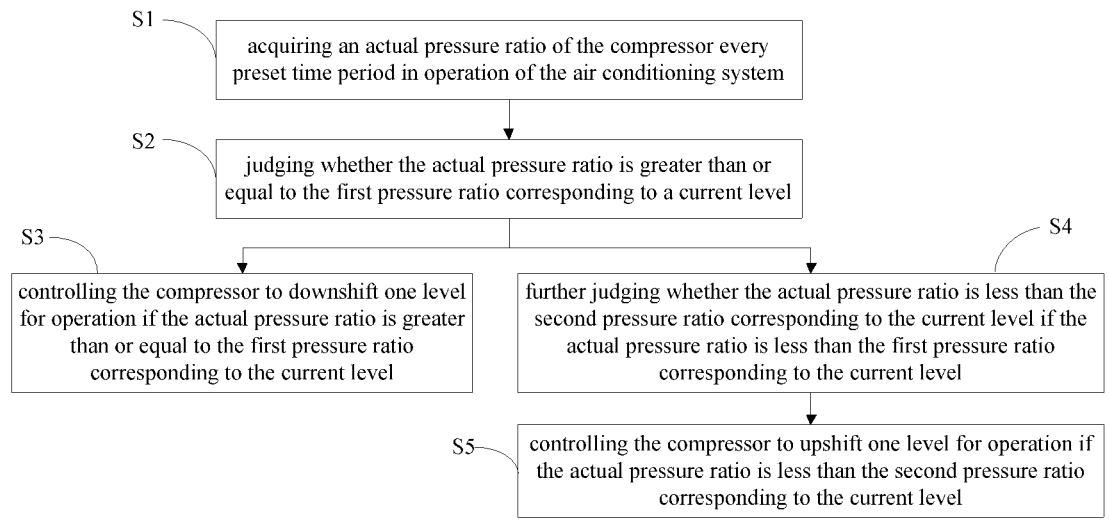
FIG. 1 is a flow chart showing a pressure ratio control method for an air conditioning system according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Description will be made hereinafter to a pressure ratio control method for an air conditioning system, a pressure ratio control device for an air conditioning system, and an air conditioning system having the same according to embodiments of the present disclosure with reference to the accompanying drawings.

FIG. 1 is a flow chart showing a pressure ratio control method for an air conditioning system according to an embodiment of the present disclosure.

In embodiments of the present disclosure, the air conditioning system may include a compressor, the compressor may be provided with a plurality of levels, each level corresponds to a first pressure ratio and a second pressure ratio which are preset in advance, and the first pressure ratio is greater than the second pressure ratio.

In an embodiment of the present disclosure, each level further corresponds to a maximum output value which is preset for the compressor in advance. When the compressor operates at individual levels, the compressor is controlled to operate at an actual output value less than or equal to a maximum output value corresponding to the current level.

In specific, it is assumed that the compressor is provided with n levels, then the compressor is provided with n maximum output values H, n first pressure ratios and n second pressure ratios. Table 1 shows correspondence between individual levels of the compressor and respective maximum output values H, first pressure ratios, and second pressure ratios for the compressor. The compressor outputs according to demands of an indoor unit, however at a value not greater than the maximum value H.

TABLE 1

| Levels of the compressor | maximum output values H of the compressor | first pressure ratios | second pressure ratios |
|---|---|---|---|
| 1 | H1 | A1 | B1 |
| 2 | H2 | A2 | B2 |
| 3 | H3 | A3 | B3 |
| 4 | H4 | A4 | B4 |
| ... | ... | ... | ... |
| n | Hn | An | Bn |

As can be seen in Table 1, each level corresponds to one maximum output value of the compressor, one first pressure ratio and one second pressure ratio. For example, when the current level of the compressor is Level 1, then the maximum output value of the compressor is H1, the first pressure ratio is A1, and the second pressure ratio is B1. Another example, when the current level of the compressor is Level 2, then the maximum output value of the compressor is H2, the first pressure ratio is A2, and the second pressure ratio is B2.

As shown in FIG. 1, in an embodiment of the present disclosure, the pressure ratio control method for an air conditioning system may include the following steps:

At S1, an actual pressure ratio of the compressor is acquired every preset time period in operation of the air conditioning system. The preset time period can be determined according to actual situation.

In an embodiment of the present disclosure, acquiring an actual pressure ratio of the compressor further includes: acquiring an exhaust pressure and an air return pressure of the compressor, and calculating a ratio of the exhaust pressure to the air return pressure as the actual pressure ratio of the compressor.

In specific, the air conditioning system first initiates the compressor to output at a value corresponding to the demand of the indoor unit (i.e., determining the current operating level of the compressor), and acquires the first pressure ratio and the second pressure ratio which are preset in advance and correspond to the current level of the compressor. Next, the actual pressure ratio R of the compressor can be obtained, based on a formula [the pressure ratio=the exhaust pressure/the air return pressure], with the exhaust pressure and the air return pressure, which are detected in real time by pressure sensors respectively arranged at an exhaust port and an air return port of the compressor.

At S2, it is judged whether the actual pressure ratio is greater than or equal to the first pressure ratio corresponding to the current level.

At S3, if the actual pressure ratio is greater than or equal to the first pressure ratio corresponding to the current level, the compressor is controlled to downshift one level for operation.

At S4, if the actual pressure ratio is less than the first pressure ratio corresponding to the current level, it is further judged whether the actual pressure ratio is less than the second pressure ratio corresponding to the current level.

At S5, if the actual pressure ratio is less than the second pressure ratio corresponding to the current level, the compressor is controlled to upshift one level for operation.

According to an embodiment of the present disclosure, when the actual pressure ratio is less than the first pressure ratio corresponding to the current level and greater than or equal to the second pressure ratio corresponding to the current level, the compressor is controlled to be maintained at the current level for operation.

In specific, the actual pressure ratio R is judged after detected. When the actual pressure ratio R≥the first pressure ratio A corresponding to the current level, it indicates that an actual output value of the compressor is high at present, and the compressor can be controlled to downshift one level for operation, so as to reduce the output value of the compressor, thereby reducing the exhaust pressure and increasing the air return pressure of the compressor, such that the actual pressure ratio of the air conditioning system is reduced, the compressor is thus effectively prevented from still operating at a high output value under a high pressure ratio, and accordingly the compressor can operate in a safe range. When the actual pressure ratio R<the first pressure ratio A corresponding to the current level, further comparison is made between the actual pressure ratio R and the second pressure ratio B corresponding to the current level. If the second pressure ratio B corresponding to the current level≤the actual pressure ratio R<the first pressure ratio A corresponding to the current level, the compressor is controlled to be maintained at the current level for operation. If the actual pressure ratio R<the second pressure ratio B corresponding to the current level, it indicates that the actual pressure ratio is within a safe range, and the compressor can be controlled to upshift one level for operation, so as to restore the output value of the compressor, thus improving the ability of heating under a low temperature.

It can be known from the above analysis that, by adjusting the output value of the compressor level-by-level, the present method ensures the actual pressure ratio of the compressor to be within a safe operating range, and allows adaption to pressure changes in the air conditioning system under different conditions at the same time. For example, when the air conditioning system operates in a low-temperature heating mode (the low-temperature heating mode used herein refers to an operating mode of the air conditioning system that guarantees operation reliability of the compressor and meets indoor capacity needs in a better way), by reducing the maximum output value of the compressor level-by-level, the pressure ratio can be controlled to be under a target limit value, thereby preventing the compressor from long-term operation beyond a safe operation range, and thus guaranteeing reliability of the compressor, that is, when the operation environment changes, the pressure ratio will be within a safe range, and the maximum output value of the compressor can be restored to a target demand level-by-level, to better meet the indoor capacity needs.

Therefore, the pressure ratio control method for an air conditioning system according to embodiments of the present disclosure can adjust the maximum output value at which the compressor operates according to the actual pressure ratio of the air conditioning system. When the actual pressure ratio is too high, the maximum output value at which the compressor operates is reduced, thus preventing the compressor from still operating at a high output value under a high pressure ratio, such that the compressor can operate in a safe range. When the operation environment is improved, the maximum output value at which the compressor operates can be restored to a target demand level-by-level, so as to effectively avoid damage to the compressor due to operation at the high pressure ratio for a long time period.

Figure 2:
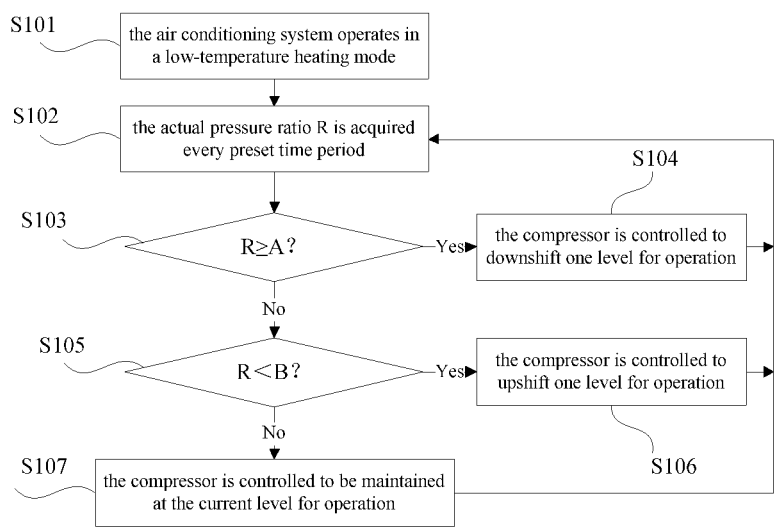
FIG. 2 is a flow chart showing a pressure ratio control method for an air conditioning system according to a specific embodiment of the present disclosure.

In order to make those skilled in the art understand the present disclosure more clearly, FIG. 2 provides a flow chart showing a pressure ratio control method for an air conditioning system according to a specific embodiment of the present disclosure. As shown in FIG. 2, the pressure ratio control method for an air conditioning system may include the following steps:

At S101, the air conditioning system operates in a low-temperature heating mode.

At S102, the actual pressure ratio R is acquired every preset time period.

At S103, it is judged whether R≥the first pressure ratio A corresponding to the current level establishes. If yes, a step S104 is executed; if no, a step S105 is executed.

At S104, the compressor is controlled to downshift one level for operation.

At S105, it is judged whether R<the second pressure ratio B corresponding to the current level. If yes, a step S106 is executed; if no, a step S107 is executed.

At S106, the compressor is controlled to upshift one level for operation.

At S107, the compressor is controlled to be maintained at the current level for operation.

In view of the above, according to the pressure ratio control method for an air conditioning system in embodiments of the present disclosure, the actual pressure ratio of the compressor is acquired every preset time period in operation of the air conditioning system, it is then judged whether the actual pressure ratio is greater than or equal to the first pressure ratio corresponding to the current level. If the actual pressure ratio is greater than or equal to the first pressure ratio corresponding to the current level, the compressor is controlled to downshift one level for operation; if the actual pressure ratio is less than the first pressure ratio corresponding to the current level, it is further judged whether the actual pressure ratio is less than the second pressure ratio corresponding to the current level; and if the actual pressure ratio is less than the second pressure ratio corresponding to the current level, the compressor is controlled to upshift one level for operation. Therefore, by adjusting the maximum limit output value of the compressor level-by-level, the present method can control the pressure ratio to be under the target limit value, thereby preventing the compressor from long-term operation beyond a safe operation range, and thus guaranteeing reliability of the compressor.

Figure 3:
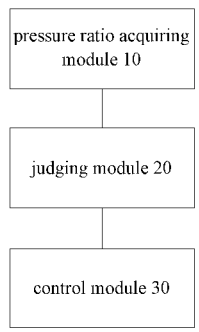
FIG. 3 is a block diagram showing a pressure ratio control device for an air conditioning system according to an embodiment of the present disclosure.

FIG. 3 is a block diagram showing a pressure ratio control device for an air conditioning system according to an embodiment of the present disclosure In embodiments of the present disclosure, the air conditioning system may include a compressor, the compressor is provided with a plurality of levels, each level corresponds to a first pressure ratio and a second pressure ratio which are preset in advance, and the first pressure ratio is greater than the second pressure ratio.

As shown in FIG. 3, the pressure ratio control device for an air conditioning system may include: a pressure ratio acquiring module 10, a judging module 20 and a control module 30.

The pressure ratio acquiring module 10 is configured to acquire an actual pressure ratio of the compressor every preset time period in operation of the air conditioning system. The judging module 20 is configured to judge whether the actual pressure ratio is greater than or equal to the first pressure ratio corresponding to a current level. The control module 30 is configured to control the compressor to downshift one level for operation when the actual pressure ratio is greater than or equal to the first pressure ratio corresponding to the current level. The judging module 20 is further configured to judge whether the actual pressure ratio is less than the second pressure ratio corresponding to the current level when the actual pressure ratio is less than the first pressure ratio corresponding to the current level. The control module 30 is further configured to control the compressor to upshift one level for operation when the actual pressure ratio is less than the second pressure ratio corresponding to the current level.

In an embodiment of the present disclosure, when the actual pressure ratio is less than the first pressure ratio corresponding to the current level and greater than or equal to the second pressure ratio corresponding to the current level, the control module 30 is further configured to control the compressor to be maintained at the current level for operation.

In an embodiment of the present disclosure, the pressure ratio acquiring module 10 is further configured to acquire an exhaust pressure and an air return pressure of the compressor and calculate a ratio of the exhaust pressure to the air return pressure as the actual pressure ratio of the compressor.

In an embodiment of the present disclosure, each level further corresponds to a maximum output value which is preset for the compressor in advance. When the compressor operates at individual levels, the control module 30 is further configured to control the compressor to operate at an actual output value less than or equal to a maximum output value corresponding to the current level.

In an embodiment of the present disclosure, the air conditioning system operates in a low-temperature heating mode.

It should be noted that those undisclosed details with respect to the pressure ratio control device for an air conditioning system can refer to details disclosed for the pressure ratio control method for an air conditioning system, which will not be elaborated herein.

According to the pressure ratio control device for an air conditioning system in embodiments of the present disclosure, the actual pressure ratio of the compressor is acquired by the pressure ratio acquiring module every preset time period in operation of the air conditioning system, it is then judged by the judging module whether the actual pressure ratio is greater than or equal to the first pressure ratio corresponding to the current level. If yes, the control module controls the compressor to downshift one level for operation; if no, it is further judged by the judging module whether the actual pressure ratio is less than the second pressure ratio corresponding to the current level; and if the actual pressure ratio is less than the second pressure ratio corresponding to the current level, the control module controls the compressor to upshift one level for operation. Therefore, by adjusting the maximum limit output value of the compressor level-by-level, the present device can control the pressure ratio to be under the target limit value, thereby preventing the compressor from long-term operation beyond a safe operation range, and thus guaranteeing reliability of the compressor.

Further, the present disclosure further provides in embodiments a non-transitory computer readable storage medium having stored therein a computer program that, when executed by a processor, causes the processor to perform a pressure ratio control method for an air conditioning system as described above.

By performing the pressure ratio control method for an air conditioning system as described above, the non-transitory computer readable storage medium according to embodiments of the present disclosure can control the pressure ratio to be under the target limit value through adjusting the maximum limit output value of the compressor level-by-level, thereby preventing the compressor from long-term operation beyond a safe operation range, and thus guaranteeing reliability of the compressor.

In addition, the present disclosure further provides in embodiments an air conditioning system, including the pressure ratio control device for an air conditioning system as described above.

With the pressure ratio control device for an air conditioning system as described above, the air conditioning system according to embodiments of the present disclosure can control the pressure ratio to be under the target limit value through adjusting the maximum limit output value of the compressor level-by-level, thereby preventing the compressor from long-term operation beyond a safe operation range, and thus guaranteeing reliability of the compressor.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples. In addition, unless specified otherwise, those skilled in the art can combine different embodiments or examples and features in different embodiments or examples described in this specification.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, like two or three, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In the present invention, unless specified or limited otherwise, the terms "mounted", "connected", "coupled", "fixed" and the like are used broadly, and may be, for example, fixed connections, detachable connections, or integrated may also be mechanical or electrical connections; may also be direct connections or indirect connections via intervening structures; may also be inner communications of two elements or mutual interaction between two elements, which can be understood by those skilled in the art according to specific situations.

In the present disclosure, unless specified or limited otherwise, a structure in which a first feature is "on" or "below" a second feature may be an embodiment in which the first feature is in direct contact with the second feature, or an embodiment in which the first feature and the second feature contacted indirectly via an intermediation. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A pressure ratio control method for an air conditioning system, wherein the air conditioning system comprises a compressor, the compressor is provided with a plurality of levels, each level corresponds to a first pressure ratio and a second pressure ratio which are preset in advance, and the first pressure ratio is greater than the second pressure ratio, wherein the pressure ratio control method comprises the following steps:
   acquiring an actual pressure ratio of the compressor every preset time period in operation of the air conditioning system;
   judging whether the actual pressure ratio is greater than or equal to the first pressure ratio corresponding to a current level, wherein the current level is one of the plurality of levels;
   controlling the compressor to downshift one level for operation if the actual pressure ratio is greater than or equal to the first pressure ratio corresponding to the current level;
   further judging whether the actual pressure ratio is less than the second pressure ratio corresponding to the current level if the actual pressure ratio is less than the first pressure ratio corresponding to the current level;
   controlling the compressor to upshift one level for operation if the actual pressure ratio is less than the second pressure ratio corresponding to the current level; and
   controlling the compressor to be maintained at the current level for operation, when the actual pressure ratio is less than the first pressure ratio corresponding to the current level and greater than or equal to the second pressure ratio corresponding to the current level.

2. The pressure ratio control method for an air conditioning system according to claim 1, wherein the acquiring an actual pressure ratio of the compressor comprises:
   acquiring an exhaust pressure and an air return pressure of the compressor; and
   calculating a ratio of the exhaust pressure to the air return pressure as the actual pressure ratio of the compressor.

3. The pressure ratio control method for an air conditioning system according to claim 1, wherein each level further corresponds to a maximum output value which is preset for the compressor in advance, wherein the pressure ratio control method further comprises:
   controlling the compressor to operate at an actual output value less than or equal to a maximum output value corresponding to the current level when the compressor operates at individual levels.

4. A non-transitory computer readable storage medium having stored therein a computer program that, when executed by a processor, causes the processor to perform a pressure ratio control method for an air conditioning system according to claim 1.

5. The pressure ratio control method for an air conditioning system according to claim 1, wherein the acquiring an actual pressure ratio of the compressor comprises:
   acquiring an exhaust pressure and an air return pressure of the compressor; and
   calculating a ratio of the exhaust pressure to the air return pressure as the actual pressure ratio of the compressor.

6. The pressure ratio control method for an air conditioning system according to claim 1, wherein each level further corresponds to a maximum output value which is preset for the compressor in advance, wherein the pressure ratio control method further comprises:
   controlling the compressor to operate at an actual output value less than or equal to a maximum output value corresponding to the current level when the compressor operates at individual levels.

7. A pressure ratio control device for an air conditioning system, wherein the air conditioning system comprises a compressor, the compressor is provided with a plurality of levels, each level corresponds to a first pressure ratio and a second pressure ratio which are preset in advance, and the first pressure ratio is greater than the second pressure ratio, wherein the pressure ratio control device comprises:
   a pressure ratio acquiring module, configured to acquire an actual pressure ratio of the compressor every preset time period in operation of the air conditioning system;
   a judging module, configured to judge whether the actual pressure ratio is greater than or equal to the first pressure ratio corresponding to a current level, wherein the current level is one of the plurality of levels; and
   a control module, configured to control the compressor to downshift one level for operation when the actual pressure ratio is greater than or equal to the first pressure ratio corresponding to the current level,
   wherein the judging module is further configured to judge whether the actual pressure ratio is less than the second pressure ratio corresponding to the current level when the actual pressure ratio is less than the first pressure ratio corresponding to the current level, and
   the control module is further configured to control the compressor to upshift one level for operation when the actual pressure ratio is less than the second pressure ratio corresponding to the current level, wherein the control module is further configured to control the compressor to be maintained at the current level for operation, when the actual pressure ratio is less than the first pressure ratio corresponding to the current level and greater than or equal to the second pressure ratio corresponding to the current level.

8. The pressure ratio control device according to claim 7, wherein the pressure ratio acquiring module is further configured to
    acquire an exhaust pressure and an air return pressure of the compressor; and
    calculate a ratio of the exhaust pressure to the air return pressure as the actual pressure ratio of the compressor.

9. The pressure ratio control device according to claim 7, wherein each level further corresponds to a maximum output value which is preset for the compressor in advance, wherein the control module is further configured to control the compressor to operate at an actual output value less than or equal to a maximum output value corresponding to the current level when the compressor operates at individual levels.

10. An air conditioning system, comprising a pressure ratio control device for an air conditioning system according claim 7.

11. The pressure ratio control device according to claim 7, wherein the pressure ratio acquiring module is further configured to
    acquire an exhaust pressure and an air return pressure of the compressor; and
    calculate a ratio of the exhaust pressure to the air return pressure as the actual pressure ratio of the compressor.

12. The pressure ratio control device according to claim 7, wherein each level further corresponds to a maximum output value which is preset for the compressor in advance, wherein the control module is further configured to control the compressor to operate at an actual output value less than or equal to a maximum output value corresponding to the current level when the compressor operates at individual levels.

13. An air conditioning system, comprising a pressure ratio control device for an air conditioning system according claim 7.

14. An air conditioning system, comprising a pressure ratio control device for an air conditioning system according claim 8.

15. An air conditioning system, comprising a pressure ratio control device for an air conditioning system according claim 9.

* * * * *